(12) United States Patent
Kataoka et al.

(10) Patent No.: US 7,391,304 B2
(45) Date of Patent: Jun. 24, 2008

(54) DRIVING OPERATION SUPPORT SYSTEM AND METHOD

(75) Inventors: Hiroaki Kataoka, Susono (JP); Seiji Kawakami, Susono (JP); Satoru Niwa, Susono (JP); Katsuhiko Iwazaki, Numazu (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 73 days.

(21) Appl. No.: 11/138,307

(22) Filed: May 27, 2005

(65) Prior Publication Data
US 2005/0270145 A1 Dec. 8, 2005

(30) Foreign Application Priority Data
Jun. 2, 2004 (JP) ............................. 2004-165021

(51) Int. Cl.
*B60Q 1/00* (2006.01)
(52) U.S. Cl. .................. 340/435; 340/436; 340/575; 340/576; 180/204; 701/45
(58) Field of Classification Search .......... 340/435, 340/522, 575, 576; 701/36, 41, 42, 45; 180/199, 180/204
See application file for complete search history.

(56) References Cited

U.S. PATENT DOCUMENTS 5,765,116 A 6/1998 Wilson-Jones et al.
6,212,453 B1 * 4/2001 Kawagoe et al. .............. 701/41
6,732,021 B2 * 5/2004 Matsumoto et al. ............ 701/1
7,034,698 B2 * 4/2006 Matsumoto et al. ......... 340/575
7,117,076 B2 * 10/2006 Shimakage et al. ........... 701/41

FOREIGN PATENT DOCUMENTS

| JP | A 7-104850 | 4/1995 |
|---|---|---|
| JP | A-11-139335 | 5/1999 |
| JP | A-11-147481 | 6/1999 |
| JP | A 2001-10518 | 1/2001 |
| JP | A-2003-058993 | 2/2003 |

* cited by examiner

*Primary Examiner*—Davetta W. Goins
(74) *Attorney, Agent, or Firm*—Oliff & Berridge, PLC

(57) ABSTRACT

In deviation prevention support ECU 10 in driving operation support system 1, an applied torque by steering torque applier 17 is set based on a vehicle speed of a vehicle. The applied torque is set to increase with increase of the vehicle speed. An upper limit according to the vehicle speed is set for this applied torque. Furthermore, in a Start interval in application of the applied torque, a rate of increasing to reach a maximum is determined according to the maximum of the applied torque. In a Close interval, the applied torque is decreased at a rate different from that in the Start interval, and the absolute rate of increasing the torque in the Start interval is set to be larger than the absolute rate of decreasing the torque in the Close interval.

7 Claims, 13 Drawing Sheets

DRIVING OPERATION SUPPORT SYSTEM AND METHOD

BACKGROUND OF THE INVENTION

1. Technical Field

The present invention relates to a driving operation support system and method and, more particularly, to a driving operation support system and method that performs lane deviation prevention support for preventing from deviation of a moving vehicle from a lane.

2. Background Art

There are vehicles with a lane deviation preventing function for preventing a vehicle running on a road with a lane drawn thereon, from deviating from the lane. A system provided with this lane deviation preventing function is, for example, the one disclosed in JP 07-104,850A (hereinafter referred to as Reference 1). This system is configured to track a center line between boundary lines of a lane, to apply a torque on the steering mechanism of the vehicle by an electric motor coupled to the steering mechanism, upon deviating the vehicle from the center line, and thereby return the vehicle toward the position of the center line.

SUMMARY OF THE INVENTION

Incidentally, Reference 1 describes nothing in particular about a temporal pattern and the magnitude of the torque applied on the steering mechanism. As a conventional method of applying such torque, the applied torque was applied in a fixed steer angle pattern and torque pattern. Namely, the torque pattern herein was set with a fixed slope and maximum of applied torque.

However, the control according to such a constant torque pattern posed a problem that with control in a low vehicle speed range, the driver felt great variation of behavior of the vehicle to the control. Furthermore, there were also desires for improvement in a deviation margin time and a driver's response time, and for improvement in the feeling about warning torque.

An object of the present invention is therefore to provide a driving operation support system and method capable of reducing the behavior felt by the driver during the control in the low vehicle speed range and improving the deviation margin time and the driver's response time and also improving the feeling about the warning torque, in execution of the lane deviation prevention control.

A driving operation support system according to the present invention to achieve the above object is a driving operation support system for, when lane deviation estimating means estimates that a moving vehicle will deviate from a lane, applying a warning torque to the vehicle to prevent a deviation from lane, wherein a pattern of application of the warning torque to the vehicle is determined according to a vehicle speed.

In the driving operation support system according to the present invention, the applied pattern of the warning torque applied with a estimation that the vehicle will deviate from the lane is determined according to the vehicle speed. By determining the applied pattern of the warning torque according to the vehicle speed in this manner, it is feasible to reduce the behavior felt by the driver during the control in the low vehicle speed range and to implement the control with improvement in the deviation margin time and the driver's response time and with improvement in the feeling about the warning torque.

The driving operation support system can be configured in such a form that the warning torque is increased with increase in the vehicle speed when estimating that the vehicle will deviate from the lane.

By carrying out the control so as to increase the warning torque with increase in the vehicle speed in this manner, it is feasible to keep the yaw rate small on the vehicle. The driver is thought to feel strongly the variation of behavior of the vehicle through the yaw rate, and the variation of the behavior felt in the low vehicle speed range by the driver can be reduced by keeping the yaw rate small.

The driving operation support system can also be configured in such a form that in the application of the warning torque to the vehicle, the warning torque is set in such a magnitude that a yaw rate on the vehicle is kept constant.

By setting the magnitude of the warning torque so as to keep the yaw rate constant on the vehicle in this manner, it is feasible to further reduce the variation of the behavior felt in the low vehicle speed range by the driver.

Furthermore, the driving operation support system can also be configured in such a form that an upper limit is set for the warning torque applied to the vehicle.

With application of the warning torque according to the vehicle speed, the variation of the behavior felt in the low vehicle speed range by the driver is reduced on one hand, whereas the driver might feel great behavior in the high vehicle speed range on the other hand. In connection therewith, if the upper limit is set for the warning torque, the warning torque can be prevented from becoming too large even in the high vehicle speed range. Therefore, the behavior variation felt by the driver can be prevented from becoming too large.

The driving operation support system can be configured in such a form that the upper limit is the warning torque at a reference vehicle speed.

When the upper limit set for the warning torque applied to the vehicle is set to the warning torque at the reference vehicle speed, it is feasible to readily set the upper limit of the warning torque applied to the vehicle.

The driving operation support system can also be configured in such a form that the warning torque increases to its maximum at a specified rate responsive to the maximum warning torque applied to the vehicle.

If in the application of the warning torque which increases to its maximum at the constant rate, the timing of occurrence of aimed vehicle behavior will vary. The time up to nullification of the warning torque will vary in decrease of the warning torque. These problems can be overcome by setting the rate of increasing the warning torque, based on the maximum warning torque.

Furthermore, the driving operation support system can also be configured in such a form that the rate of increasing the warning torque is so set that a time necessary to reach the maximum warning torque is kept constant.

Where the warning torque is large, a long time is necessary to reach its maximum value. This will pose a problem that a sufficient deviation margin time cannot be secured in the high vehicle speed range. The time necessary to reach the maximum warning torque can be kept not too long by setting the rate of increasing the warning torque as follows: the rate of increasing the warning torque is so set that the time necessary to reach the maximum warning torque becomes constant based on the maximum warning torque. Therefore, it is feasible to secure a sufficient deviation margin time in the high vehicle speed range.

Another driving operation support system according to the present invention to achieve the above object is a driving operation support system for, when lane deviation estimating means estimates that a moving vehicle will deviate from a lane, applying a warning torque to the vehicle to prevent a lane deviation, wherein in an operation of, after increase of the warning torque, decreasing the warning torque increased, the warning torque is decreased at a different absolute rate from that during the increase of the warning torque.

Where the absolute rate of increasing the warning torque is equal to the absolute rate of decreasing the warning torque, it is difficult to secure the deviation margin time and to eliminate the driver's uncomfortable feeling or the like due to sudden removal of the warning torque, all together. In this respect, when the absolute rate of decreasing the warning torque is set at a different absolute rate from that of increasing the warning torque, it is feasible to readily implement the control to overcome these problems at once.

The driving operation support system can be configured in such a form that the absolute rate of increasing the warning torque is set larger than the absolute rate of decreasing the warning torque.

When the absolute rate of increasing the warning torque is set at a larger value than the absolute rate of decreasing the warning torque, it is feasible to secure a sufficient deviation margin time and to inform the driver of a start of the deviation prevention support by change of the steering torque in an early stage. It is also feasible to reduce the driver's uncomfortable feeling due to sudden decrease of the warning torque and to moderately resolve the behavior change of the vehicle after occurrence of the warning torque and before nullification of the warning torque.

Still another driving operation support system according to the present invention to achieve the above object is a driving operation support system for, when lane deviation estimating means estimates that a moving vehicle will deviate from a lane, applying a warning torque to the vehicle to prevent a lane deviation, wherein in an operation of increasing the warning torque to a maximum, a rate of increasing the warning torque in a predetermined first increase period from a start of the increase is set larger than a rate of increasing the warning torque in a second increase period subsequent to the first increase period.

In this configuration, the period from the start of applying the warning torque to reaching the maximum torque is divided into the first increase period and the second increase period, and the rate of increasing the warning torque in the first increase period is set larger than that in the second increase period, whereby it is feasible to initiate the vehicle behavior for lane deviation prevention in an early stage.

The driving operation support system can also be configured in such a form that in an operation of decreasing the warning torque from the maximum, a rate of decreasing the warning torque in a predetermined first decrease period from a start of the decrease is set larger than a rate of decreasing the warning torque in a second decrease period subsequent to the first decrease period.

In this configuration, the period from application of the maximum torque to release of the application of the torque is also divided into the first decrease period and the second decrease period, and the decrease rate of the warning torque in the first decrease period is set larger than that in the second decrease period, whereby it is feasible to terminate the application of the warning torque, without causing the driver to have a great uncomfortable feeling.

The driving operation support system can also be configured in such a form that an absolute rate of increasing the warning torque in the first increase period is smaller than an absolute rate of decreasing the warning torque in the first decrease period.

In this configuration, the driving operation support system is configured in such a form that the absolute rate of increasing the warning torque in the first increase period is smaller than that of decreasing the warning torque in the first decrease period, whereby it is feasible to secure a sufficient deviation margin time and to inform the driver of a start of the deviation prevention support by change of the steering torque. In addition, it is also feasible to reduce the driver's uncomfortable feeling due to sudden decrease of the warning torque and to moderately resolve the behavior of the vehicle after occurrence of the warning torque before nullification of the warning torque.

Furthermore, the driving operation support system can also be configured in such a form that a process of preventing the lane deviation by the application of the warning torque is set to be terminated by a steering operation and that when the process is terminated by the steering operation, the torque is decreased at the rate of decreasing the torque in the second decrease period from the start of the decrease.

During the driver's steering operation, the driver is already manipulating the steering wheel in the direction to return the vehicle on the lane, without need for quickly decreasing the warning torque, and there is no friction component in the steering mechanism. In this case, therefore, there is no need for setting the first decrease period. Therefore, the setting of the first decrease period is canceled to decrease the waning torque without quick decrease thereof.

As described above, the driving operation support system according to the present invention achieves the lane deviation prevention control while decreasing the behavior change felt by the driver during the control in the low vehicle speed range, securing the deviation margin time and driver's reaction time, and improving the feeling about the warning torque.

DESCRIPTION OF THE PREFERRED EMBODIMENT OF THE PRESENT INVENTION

Figure 1:
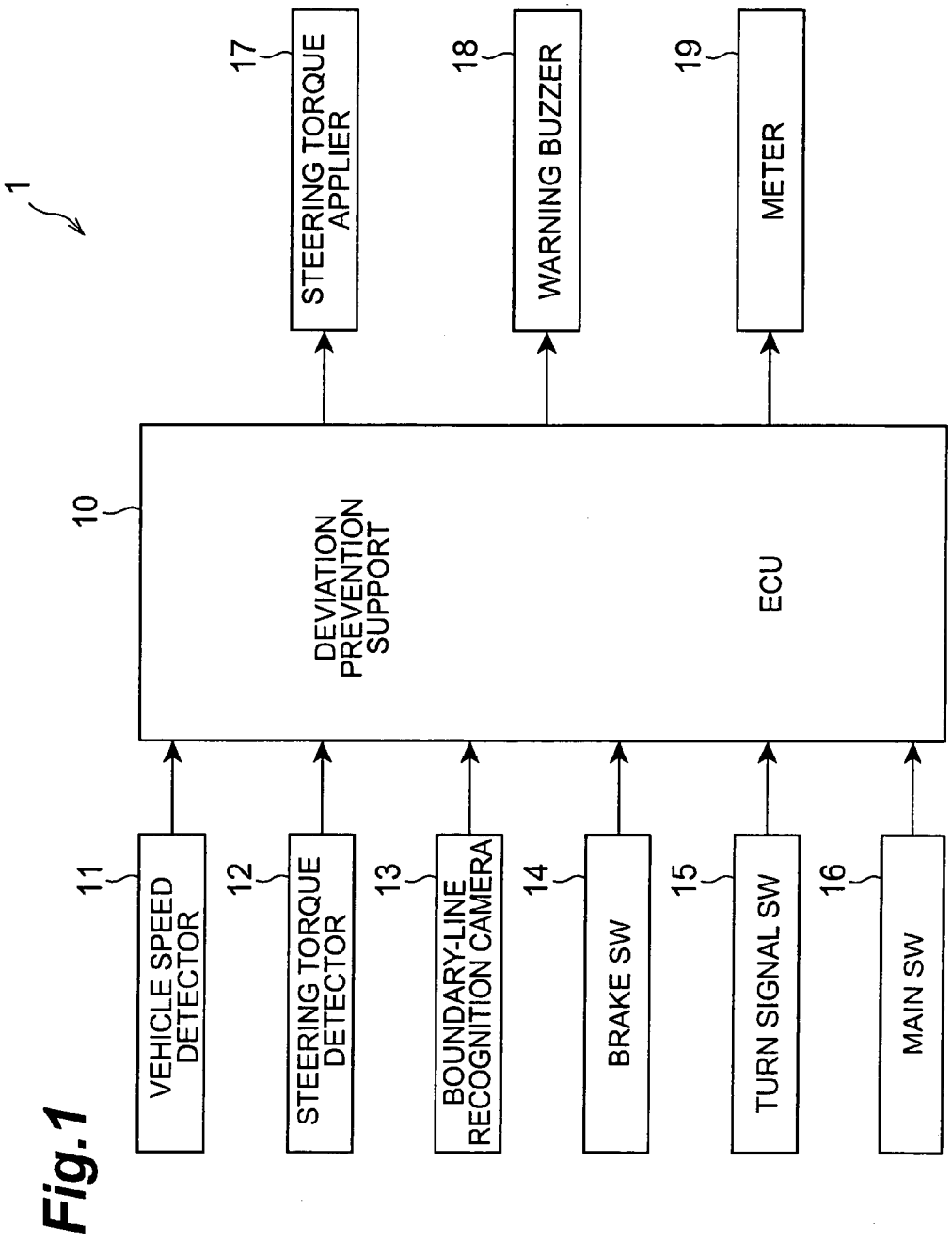
FIG. 1 is a block diagram of a driving operation support system according to the present invention.

The preferred embodiment of the present invention will be described below with reference to the drawings. FIG. 1 is a block diagram of a driving operation support system according to an embodiment of the present invention.

As shown in FIG. 1, driving operation support system 1 according to the present embodiment is equipped with deviation prevention support ECU (Electric Control Unit) 10. Connected to the deviation prevention support ECU 10 are a vehicle speed detector 11, a steering torque detector 12, a boundary-line recognition camera 13, a brake switch 14, a turn signal switch 15, and a main switch 16. Also connected to the ECU 10 are a steering torque applier 17, a warning buzzer 18, and a meter 19.

The deviation prevention support ECU 10 estimates whether the host vehicle will deviate from the lane, based on information outputted from the vehicle speed detector 11, from the steering torque detector 12, from the boundary-line recognition camera 13, and so on. When the ECU results in estimating that the host vehicle will deviate from the lane after a predetermined time, it outputs a predetermined signal to the steering torque applier 17, to the warning buzzer 18, and so on. The more detailed functions of the deviation prevention support ECU 10 will be described later.

The vehicle speed detector 11 is composed, for example, of sensors attached to the front wheel portions of the vehicle, which detect the speeds of the wheels to determine the vehicle speed during driving of the host vehicle. The vehicle speed detector 11 outputs the detected vehicle speed to the deviation prevention support ECU 10.

The steering torque detector 12 is, for example, a detector attached to a steering rod connected to the steering wheel manipulated by the driver in the vehicle interior, and detects the steering torque exerted on the steering wheel by driver's steering operation. The steering torque detector 12 outputs the detected steering torque to the deviation prevention support ECU 10.

The boundary-line recognition camera 13 is, for example, a camera located at a position in the vehicle interior where it can view the circumstances outside and in front of the vehicle from the upper part of the windshield, and takes an image of the circumstances outside the vehicle through the windshield. The boundary-ine recognition camera 13 outputs the image of the exterior circumstances thus taken, to the deviation prevention support ECU 10.

The brake switch 14 is, for example, a switch attached to a brake pedal manipulated by the driver in the car interior, and detects a driver's operation on the brake pedal. The brake switch 14 outputs a brake signal to the deviation prevention support ECU 10 when the driver depresses the brake pedal to apply the brakes on the vehicle.

The turn signal switch 15 is, for example, a switch attached to a turn signal lever manipulated by the driver in the vehicle interior, and detects a driver's operation on the turn signal lever. The turn signal switch 15 outputs a turn indication signal to the deviation prevention support ECU 10 when the driver manipulates the turn signal lever to give a turn signal.

The main switch 16 is, for example, a switch attached at a position where the driver can set it in the vehicle interior, e.g., inside the door on the driver side. When the driver turns the main switch 16 on, the main switch 16 outputs an on signal to the deviation prevention support ECU 10. Receiving this on signal, the deviation prevention support ECU 10 initiates the deviation prevention support.

The steering torque applier 17 is, for example, an electric motor in an electric power steering system connected to the steering rod of the steering system. The steering torque applier 17 applies a predetermined steering torque being a warning torque of the present invention, to the steering rod, based on an application signal outputted from the deviation prevention support ECU 10. In the present specification, the steering torque applied by the steering torque applier 17 is referred to as an applied torque.

The warning buzzer 18 is, for example, a buzzer disposed in the instrument panel part in the vehicle interior, and emits a warning in a predetermined sound volume enough to reach the driver. The warning buzzer 18 is provided with multiple types of signals, and issues a predetermined type of warning, based on a warning signal outputted from the deviation prevention support ECU 10.

Figure 2:
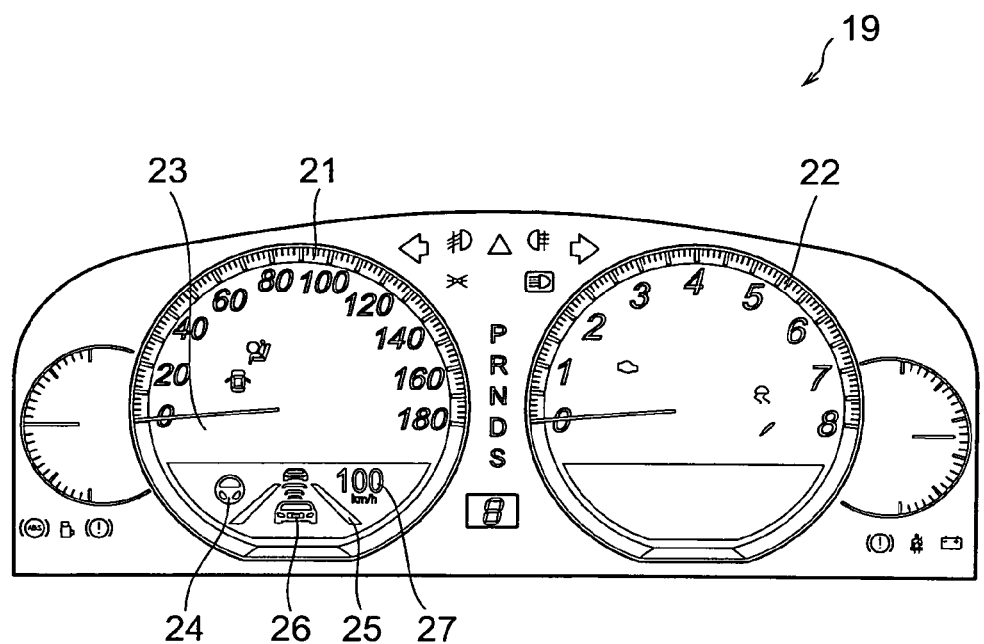
FIG. 2 is a front view of a meter unit.

The meter 19 is provided with a speed meter 21 and a tachometer 22, as shown in FIG. 2. The display part of the speed meter 21 provides displays of deviation prevention support execute indication 23 expressed by letters of "LKA" (lane keep assist), steering control execute indication 24, boundary-line recognition indication 25, radar cruise indication 26, radar cruise setting speed indication 27, and so on. These display portions provide appropriate displays, based on a display signal outputted from the deviation prevention support ECU 10.

Figure 3:
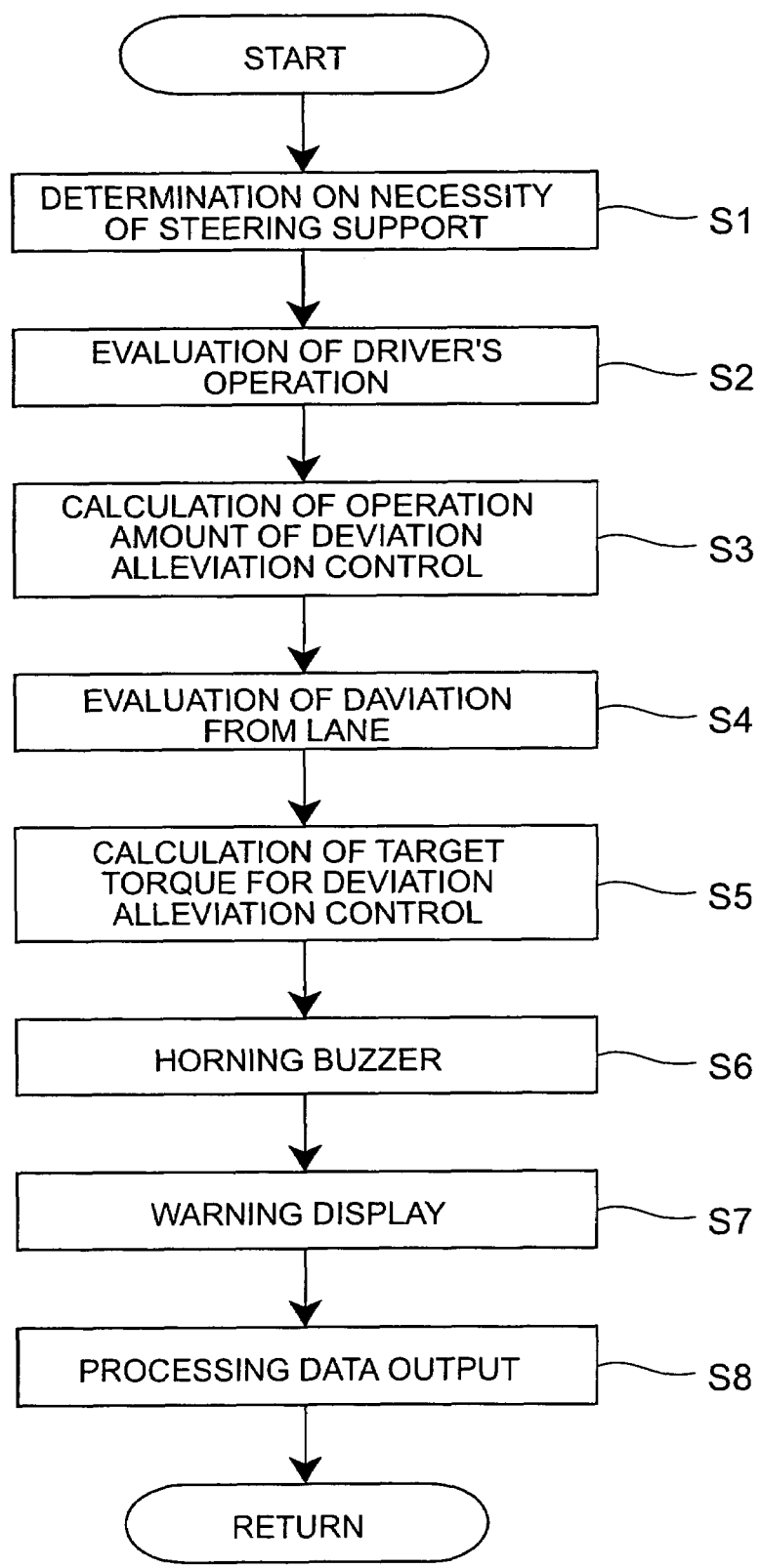
FIG. 3 is a flowchart showing a control procedure of the driving operation support system according to the present invention.

The operation or action of the driving operation support system 1 of the present embodiment having the above configuration will be described below. The present embodiment is characterized by a pattern of the applied torque by the steering torque applier 17 during execution of the lane deviation prevention, for performing the lane deviation prevention support, but the whole of the driving support control will be described before the detailed description of this feature of the present embodiment. FIG. 3 is a flowchart showing a control procedure of driving operation support system 1 according to the present embodiment.

In the driving operation support system 1 according to the present embodiment, the deviation prevention support ECU 10 checks whether the main switch 16 is on, as a preliminary process to determine a start of the driving support. When the main switch 16 is on, a boundary-line information process of extracting boundary-lines by image processing from an image taken by the boundary-line recognition camera 13 is carried out to recognize boundary-lines of a lane on which the host vehicle is running. Then a boundary-line recognition process is carried out and a flag process is carried out based on the result of the detection of boundary-lines. After execution of the boundary-line information process, it is determined whether it is necessary to perform steering support (S1). The determination on whether it is necessary to perform the steering support is carried out based on the vehicle speed information outputted from the vehicle speed detector 11, the information on whether boundary-lines are recognized by the boundary-ine information process, and so on.

After the determination is made on whether it is necessary to perform the steering support, a evaluation of driver's operation is then made (S2). The evaluation of driver's operation is carried out based on the steering torque signal from the steering torque detector 12, the brake signal from the brake switch 14, the turn indication signal from the turn signal switch 15, and so on. When the steering torque signal indicates a value over a predetermined torque level, it is determined that the driver manipulated the steering wheel. When the brake switch 14 outputs the brake signal, it is determined that the driver performed the braking operation. When the turn signal switch 15 outputs the turn indication signal, it is determined that the driver manipulated the turn signal lever. Whether the driving support is to be continued is determined based on the results of determinations on these driver's operations.

After the evaluation of driver's operation is made an operation amount of deviation alleviation control is subsequently calculated (S3). Calculated herein is a target torque necessary for returning the host vehicle to the inside of the lane. The operation amount of deviation alleviation control is calculated using a turning radius of the host vehicle determined based on the steering wheel angle of the steering wheel, and the vehicle speed of the host vehicle. A predetermined upper limit is set for the operation amount of deviation alleviation control. The calculation of the deviation alleviation control operation amount will be further described later.

After the calculation of the deviation alleviation control operation amount, an evaluation of deviation from the lane is made (S4). It is determined herein whether the host vehicle will deviate from the lane after passage of a predetermined time, e.g., approximately one second later, and, based on the result of the evaluation on the deviation from the lane, it is determined whether activation of the steering torque applier 17 and others are to be demanded. The evaluation on the deviation from the lane is made based on the state of necessity for the steering support, the state of detection of boundary-lines, an offset amount of the host vehicle relative to the lane, the yaw angle, estimated R of the road, the lane width, and so on.

Figure 4:
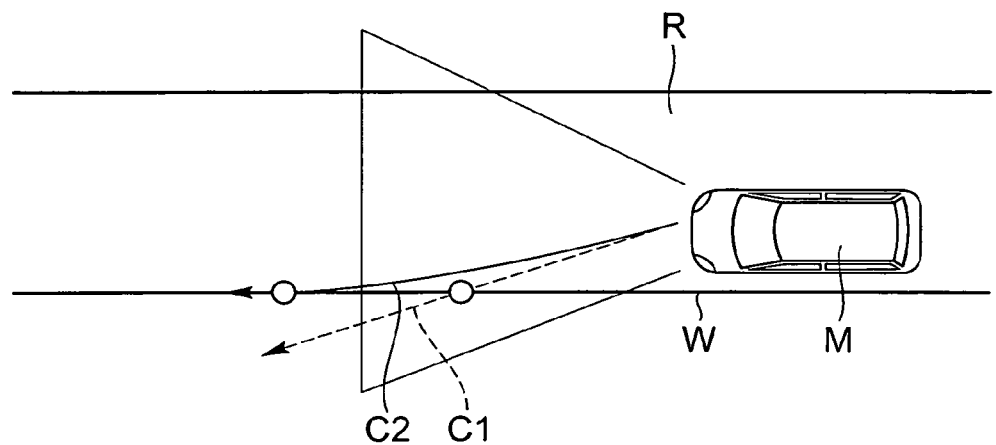
FIG. 4 is an illustration for explaining travel paths of a vehicle with and without deviation prevention support in the vehicle running on a road.

Now, let us suppose that the host vehicle M is running on a road R, as shown in FIG. 4. A travel arrival position of the host vehicle M about one second later is calculated based on the speed of the host vehicle M, the yaw angle, the offset amount relative to the road R, and so on. When it is determined based on the result of the calculation that a travel path C1 of the host vehicle M up to arrival at the travel arrival position is on a boundary-line W, the steering torque applier 17 applies the applied torque in the magnitude calculated in a subsequent process, to change the path, for example, to a travel path C2. The control is performed so as to change the travel path in this manner. This change of the travel path from C1 to C2 lengthens the deviation margin time before a deviation of the vehicle from the boundary-line. The application of the applied torque to the steering wheel notifies the driver of a risk of the deviation, to encourage the driver himself or herself to perform an operation to prevent the lane deviation.

After evaluation of the deviation from the lane, a target torque of deviation alleviation control is calculated (S5). At this step, the ECU calculates a wave pattern of the applied torque actually applied by the steering torque applier 17 in accordance with the deviation alleviation operation amount. The wave pattern of the applied torque at this time will be further described later.

After the calculation of the deviation alleviation control target torque, a horning buzzer process is carried out for informing the driver of execution of the deviation prevention support (S6). When the evaluation of deviation from the lane process results in determining that the host vehicle will deviate from the lane and when the steering torque applier 17 applies the applied torque, the waning buzzer 18 outputs a warning of predetermined sound.

In conjunction with the execution of the homing buzzer process, a warning display process is carried out (S7). When the evaluation of deviation from the lane process results in determining that the host vehicle will deviate from the lane and when the steering torque applier 17 applies the applied torque, the meter 19 provides the displays of deviation prevention support execute indication 23, boundary-line recognition indication, and so on.

After that, a predetermined data output process is carried out (S8), thereby completing the driving support.

Next, the time-varying wave pattern of the applied torque applied by the steering torque applier 17 will be described. The deviation prevention support ECU 10 of the present embodiment outputs an applied torque signal of a time-varying wave pattern, for example as shown in FIG. 5, to the steering torque applier 17, and the steering torque applier 17 applies the applied torque to the steering rod, thereby applying the steering torque on the steered wheels.

Figure 5:
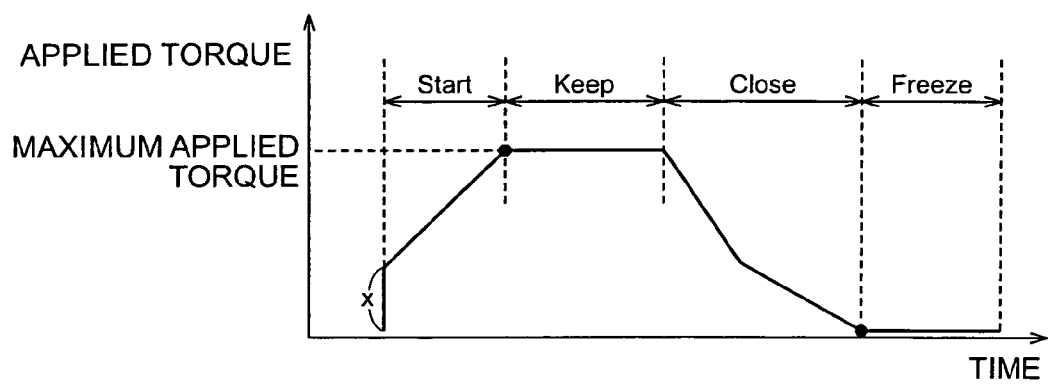
FIG. 5 is a graph showing an example of a wave pattern of applied torque in the deviation prevention support.

In the time-varying wave pattern shown in FIG. 5, the applied torque is increased at a constant rate in an interval from a start of the deviation prevention support up to reach the maximum applied torque (Start interval). After reaching the maximum applied torque, the applied torque is kept constant for a while (Keep interval). Thereafter, where an application end condition is met, the applied torque is decreased (Close interval) for a while, and thereafter the applied torque is reduced at a smaller decrease rate up to 0. Thereafter, the process is terminated (Freeze interval). Concepts about the setting of the time-varying wave pattern of the applied torque will be individually described below.

For preparing the wave pattern of the applied torque as described above, the maximum applied torque is first determined. The maximum applied torque is determined as the deviation alleviation control operation amount according to the vehicle speed of the host vehicle and others at the step S3 in the flowchart shown in FIG. 3. If the maximum applied torque is constant independent of the vehicle speed, there will arise no particular problem in terms of the steering feeling and the vehicle behavior in the high vehicle speed range even if the maximum applied torque is relatively large. However, if the same maximum applied torque as the maximum applied torque of the magnitude causing no problem in the vehicle behavior in the high vehicle speed range is applied in the low vehicle speed range, the driver will feel the vehicle behavior change large, so as to cause a problem in terms of the steering feeling.

Figure 6:
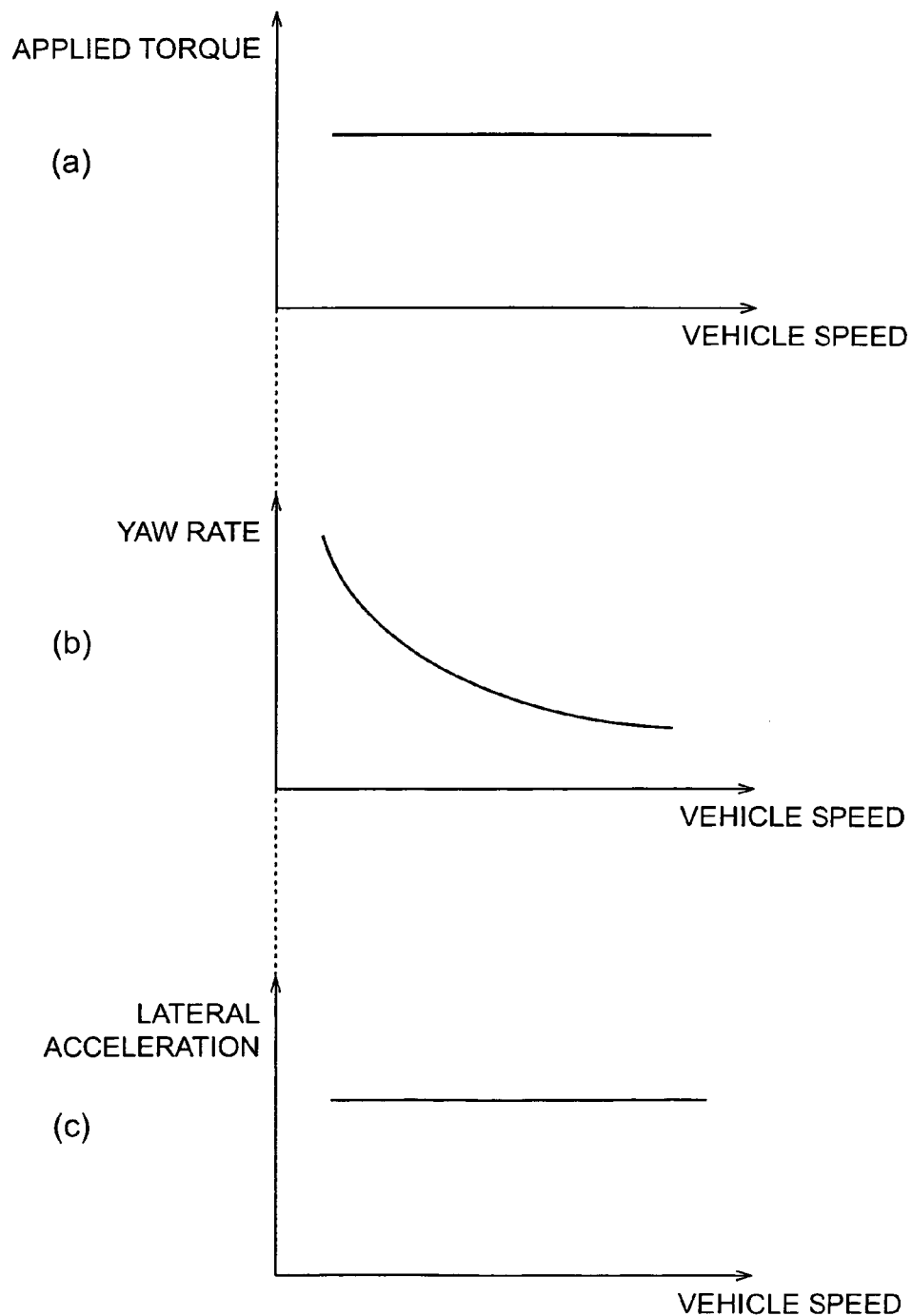
FIG. 6(a) is a graph showing an example of setting of applied torque where the applied torque is constant regardless of vehicle speed, FIG. 6(b) a graph showing the relationship between vehicle speed and yaw rate in the forgoing setting, and FIG. 6(c) a graph showing the relationship between vehicle speed and lateral acceleration in the foregoing setting.

For example, let us consider a case where the maximum applied torque is constant independent of the vehicle speed, as shown in FIG. 6(*a*). In this case, the vehicle speed is inversely proportional to the yaw rate caused by the vehicle speed and applied torque, as shown in FIG. 6(*b*), and the lateral acceleration is constant independent of the vehicle speed, as shown in FIG. 6(*c*). Therefore, with increase in the vehicle speed, the lateral acceleration is invariant, whereas the yaw rate decreases. This decrease of the yaw rate is considered to induce driver's uncomfortableness of the steering feeling.

In order to alleviate such uncomfortableness, the maximum applied torque is set according to the vehicle speed. Specifically, the maximum applied torque is set according to the vehicle speed so that the maximum applied torque is increased with increase in the vehicle speed, whereby it is feasible to reduce the driver's uncomfortableness during execution of the lane deviation prevention support.

Figure 7:
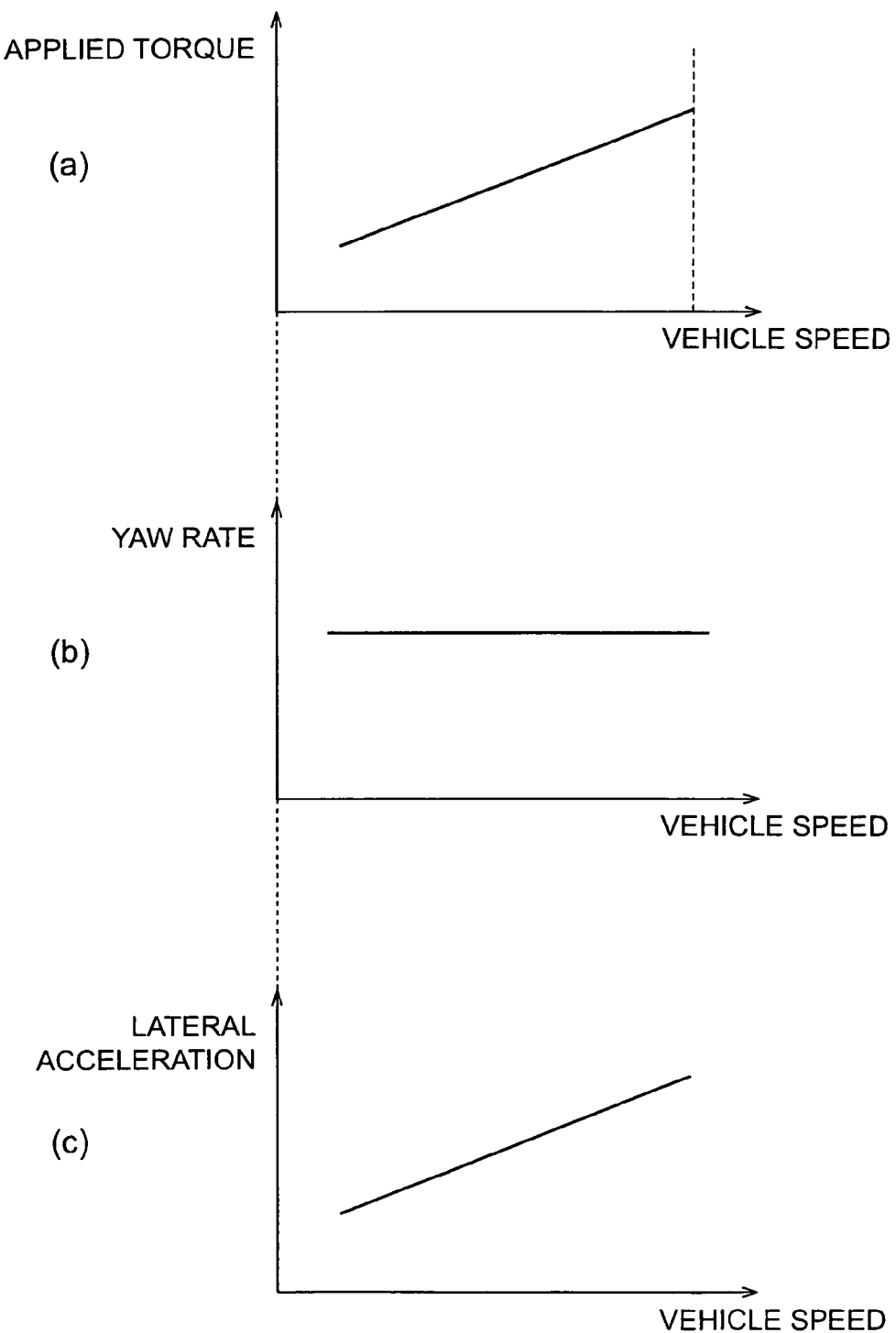
FIG. 7(a) is a graph showing an example of setting of applied torque where the applied torque is increased with increase in vehicle speed, FIG. 7(b) a graph showing the relationship between vehicle speed and yaw rate in the forgoing setting, and FIG. 7(c) a graph showing the relationship between vehicle speed and lateral acceleration in the foregoing setting.

Particularly, in application of the maximum applied torque, a preferred setting is such that the yaw rate on the vehicle becomes constant independent of the vehicle speed. Let us suppose that the maximum applied torque is set to increase with increase in the vehicle speed, as shown in FIG. 7(a). In setting the maximum applied torque in this manner, it is preferable to set the maximum applied torque so that the yaw rate due to the applied torque becomes constant independent of the vehicle speed, as shown in FIG. 7(b).

When the maximum applied torque is set so that the yaw rate is constant independent of the vehicle speed, the lateral acceleration varies according to the vehicle speed, so that the lateral acceleration can be increased with increase in the vehicle speed, as shown in FIG. 7(c). Therefore, it is feasible to further reduce the driver's uncomfortableness during the application of the applied torque.

Incidentally, where the maximum applied torque is increased with increase in the vehicle speed, the difference between the maximum applied torque and the real vehicle behavior can be prevented from becoming too large in the low to middle-high vehicle speed range of 50-100 km/h. In this case, however, the lateral acceleration, i.e., the real vehicle behavior will become too large in the high vehicle speed range over the foregoing low to middle-high speed range, so as to possibly cause driver's uncomfortableness.

Figure 8:
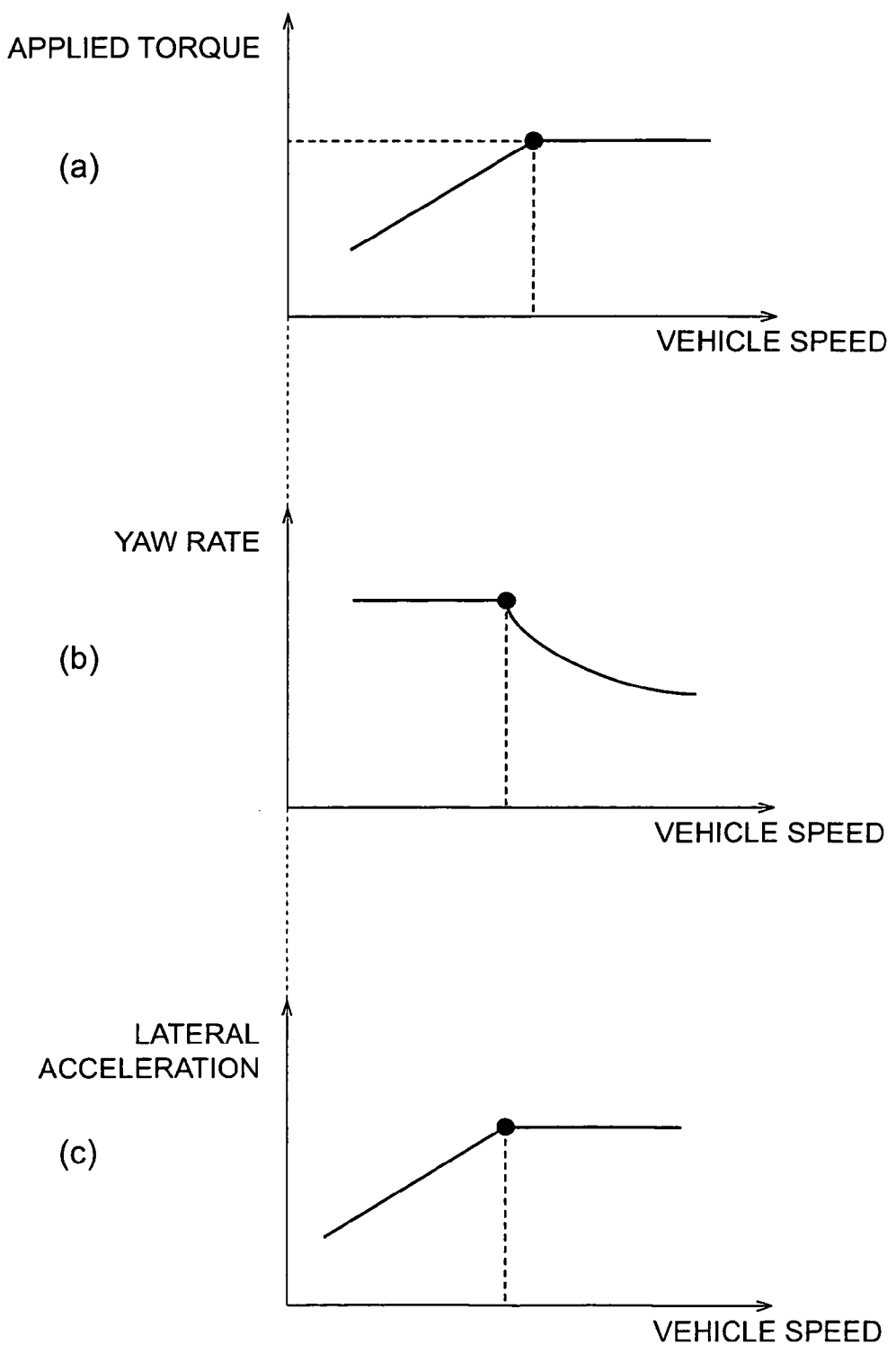
FIG. 8(a) is a graph showing an example of setting of applied torque where the applied torque is increased with increase in vehicle speed and where an upper limit is set for the applied torque, FIG. 8(b) a graph showing the relationship between vehicle speed and yaw rate in the forgoing setting, and FIG. 8(c) a graph showing the relationship between vehicle speed and lateral acceleration in the foregoing setting.

For setting the maximum applied torque, therefore, an upper limit is set for the vehicle speed in the change of the maximum applied torque according to the vehicle speed. This upper limit is determined, for example, according to a reference vehicle speed. Specifically, during execution of the deviation prevention support at vehicle speeds not more than the reference vehicle speed set as the upper limit, as shown in FIG. 8(a), the maximum applied torque is changed according to the vehicle speed so that the maximum applied torque is increased with increase in the vehicle speed, whereby the yaw rate due to the applied torque becomes constant, as shown in FIG. 8(b). On the other hand, during execution of the deviation prevention support at vehicle speeds over the reference vehicle speed, the maximum applied torque is constant. When the maximum applied torque is kept constant, the yaw rate decreases, but the lateral acceleration is constant, as shown in FIG. 8(c), so as to reduce the difference between steering torque and actual vehicle behavior.

By setting the maximum applied torque in this manner, the driver's uncomfortableness due to the decrease of the yaw rate can be relieved in the low vehicle speed range. The driver's uncomfortableness due to the difference between steering torque and actual vehicle behavior can also be relieved in the high vehicle speed range.

Next, the deviation alleviation control target torque calculated at step S5 in the flowchart shown in FIG. 3 will be described. Set herein are time-varying wave patterns of the applied torque up to reaching the maximum applied torque and from the maximum applied torque to the applied torque of 0. The time-varying wave patterns of the applied torque are set based on the maximum applied torque and others.

Figure 9:
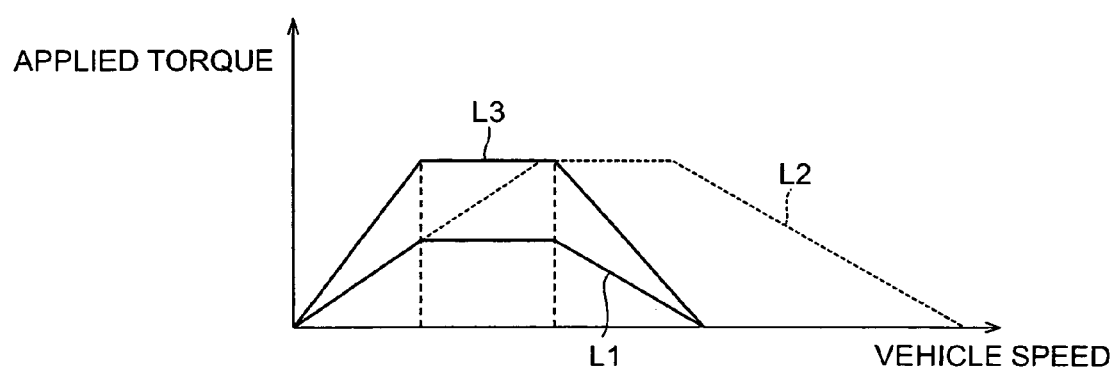
FIG. 9 is a graph showing a temporal change of applied torque in the driving operation support system according to the present invention, in comparison with that in the conventional system.

For example, let us suppose that a basic pattern of the applied torque is set as indicated by a thin line L1 in FIG. 9. In the operation of changing the applied torque to the maximum applied torque corresponding to the vehicle speed in accordance with the basic pattern of this form, if a rate of change up to the maximum applied torque and a rate of change in decrease from the maximum applied torque are kept each constant and if the maximum applied torque becomes over the basic pattern, as indicated by a dashed line L2 in FIG. 9, a rise time (a time from a start of applying torque up to reach the maximum applied torque) and a fall time (a time from a start of decrease of torque at the maximum applied torque to an end of applying torque) will both become long.

The increase of the rise time will result in lengthening the time before occurrence of aimed vehicle behavior. This will result in failing to secure a sufficient deviation margin time in the high vehicle speed range. The increase of the fall time will result in failing to quickly terminate the control after an end of the operation necessary for the deviation prevention support, so as to cause driver's uncomfortableness.

For solving this problem, a rate of increasing the applied torque during the rise is so set that the time up to reach the maximum applied torque is set to a predetermined constant time, e.g., 0.4 sec, as indicated by a solid line L3 in FIG. 9. By setting the rate of increasing the applied torque up to reach the maximum applied torque in this manner, it is feasible to keep constant the time from the start of applying torque up to reach the maximum applied torque. This makes it feasible to shorten the time up to occurrence of the aimed vehicle behavior. Therefore, a sufficient deviation margin time can be secured even in the high vehicle speed range. Since after the start of the deviation prevention support the large applied torque is applied in the high speed range, the driver can be informed through the steering wheel that the present status is a dangerous situation where the vehicle will deviate from the lane.

Just as in the case of the change rate during the rise, a rate of decreasing the applied torque during the fall from the start of decrease from the maximum applied torque up to the end of application is also set based on the maximum applied torque. For example, a rate of decreasing the warning torque is so set that a time from the start of decrease from the maximum applied torque up to the end of application becomes a second predetermined time. Supposing the rise time of applied torque is set to a first predetermined time, the second predetermined time as the fall time is desirably set to be longer than the first predetermined time. This setting achieves the following advantages: during the rise a warning can be quickly issued after it is determined that the warning is necessary; during the fall it is feasible to alleviate the driver's uncomfortableness due to quick variation of applied torque.

Once the rate of increasing the applied torque during the rise is determined, the rate of decreasing the applied torque during the fall can also be considered to be determined so as to reduce the applied torque at the same absolute rate as the rate of increasing the applied torque during the rise. However, if the applied torque is decreased at the same absolute rate as the rate of increasing the applied torque during the rise, the applied torque will suddenly become null in the high speed range, so as to change the steering load. This makes the driver feel uncomfortable.

For this reason, during the fall from the maximum applied torque, the applied torque is decreased at the rate whose absolute value is smaller than the rate of increasing the applied torque during the rise, as indicated by the solid line L3 in FIG. 9. Specifically, for example, the change rate is set so that the fall time becomes 0.6 sec.

By decreasing the applied torque at the rate whose absolute value is smaller than the rate of increasing the applied torque during the rise in this manner, it is feasible to alleviate the driver's uncomfortableness and to moderately resolve the behavior of the vehicle. Accordingly, it is feasible to achieve the objectives of securing the deviation margin time during the rise and resolving driver's uncomfortableness during the fall, at once.

On the other hand, on the occasion of starting the deviation prevention support, the system is required to notify the driver under driving of the start of the deviation prevention support in an early stage and with certainty. In notifying the driver of the deviation prevention support, a secure method is to make the driver feel the applied torque. For this reason, upon the start of the deviation prevention support, the system is demanded to make the driver fast feel the applied torque. In the deviation prevention support, in order to secure the deviation margin time, the system is also required to start the vehicle behavior for the deviation prevention support in an early stage.

For meeting these demands, the initial value of applied torque is determined based on the friction property of the steering mechanism. If the applied torque by the deviation prevention support is not more than the friction amount of the steering system due to the friction property of the steering mechanism, the driver will not feel the applied torque. When the applied torque exceeds the friction amount of the steering system, the driver comes to feel the applied torque. When the applied torque exceeds the friction amount of the steering system, the vehicle behavior for the deviation prevention support appears.

Figure 10:
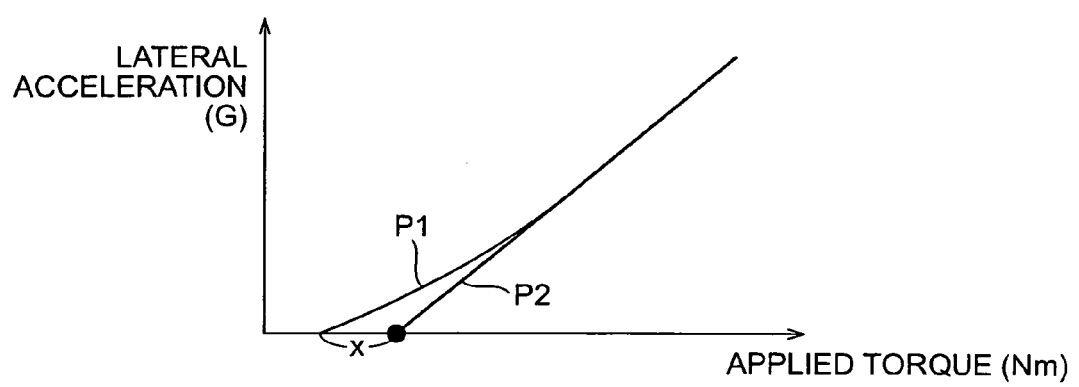
FIG. 10 is a graph showing the relationship of applied torque against lateral acceleration, used in setting of an initial value of applied torque.

For this reason, a real characteristic between steering torque and lateral acceleration in the host vehicle is determined to obtain a real characteristic curve P1, as shown in FIG. 10. A tangent P2 to this real characteristic curve P1 is determined, and an intersection is obtained between the tangent P2 and a line at the lateral acceleration of 0. A torque value X indicated at this intersection is defined as a friction compensation amount, and is set as an initial value of the applied torque. In the present embodiment the specific torque is set as the initial value, but the applied torque may be arranged to quickly increase in an early stage by setting a certain time range (referred to as a first increase period) and setting a torque increase rate larger in the first increase period than that in a second torque increase period subsequent to the first increase period. The case where the specific torque (not being 0) is set as the initial value is equivalent to a case where in the actual control the first increase period is reduced to a time step length of the control.

By setting the initial value of the applied torque in this manner, it is feasible to notify the driver of the start of the deviation prevention support in the early stage by making the driver feel the applied torque. It is also feasible to make the host vehicle quickly start the vehicle behavior for the deviation prevention support.

On the other hand, in the decrease of the applied torque from the maximum, the system is demanded to quickly decrease the applied torque to 0. However, if the applied torque is reduced to 0 at once, the quick elimination of the applied torque can result in making the driver feel uncomfortable, and thus the system is required to resolve such uncomfortableness. When the host vehicle returns into the lane without the vehicle behavior for the deviation prevention support for some reason of the applied torque being relatively strong and disturbance being small, the system is required to reduce the deflection angle of the vehicle.

For meeting these demands, the applied torque can also be quickly reduced by the degree equivalent to the friction amount of the steering system during the decrease of the applied torque from the maximum. The friction of the steering system herein acts in the opposite direction to that in the increase case of the applied torque so as to cancel the applied torque. Therefore, the friction compensation amount is determined to be a torque quantity 2X which is double the torque quantity X shown in FIG. 10. A period where the applied torque corresponding to the friction compensation amount is decreased is defined as a quick decrease range (first torque decrease period), and a decrease rate is set larger in the first torque decrease period than that in a second decrease period subsequent to the first torque decrease period. In this quick decrease range, even if the applied torque is quickly decreased, it is canceled out by the steering friction, and the decrease of force actually acting on the steered wheels is small. Therefore, the driver is unlikely to feel uncomfortable with the decrease of the applied torque. In addition, the deflection angle of the vehicle can be made small even if the vehicle behavior for deviation prevention support is not carried out.

The application of the applied torque by the steering torque applier 17 is terminated when a predetermined application end condition is met. The application end condition is one of a steering operation, a braking operation, a turn signal operation, an operation of turning the main switch off in failure, a return from a lane deviation state, and so on. The steering operation, the braking operation, the turn signal operation, and the main switch off operation in failure are determined based on input signals from the steering torque detector 12, from the turn signal switch 15, from the brake switch 14, and from the main switch 16, respectively. The return from the lane deviation state is determined based on arithmetic processing in the deviation prevention support ECU 10.

When the driver's steering operation among these terminates the application of the applied torque, there is no friction amount of the steering system. Therefore, when the application of the applied torque is terminated by the driver's steering operation, the quick decrease range of applied torque is not set, and the applied torque is not quickly decreased but is decreased to 0 without setting the quick decrease range of applied torque.

Figure 11:
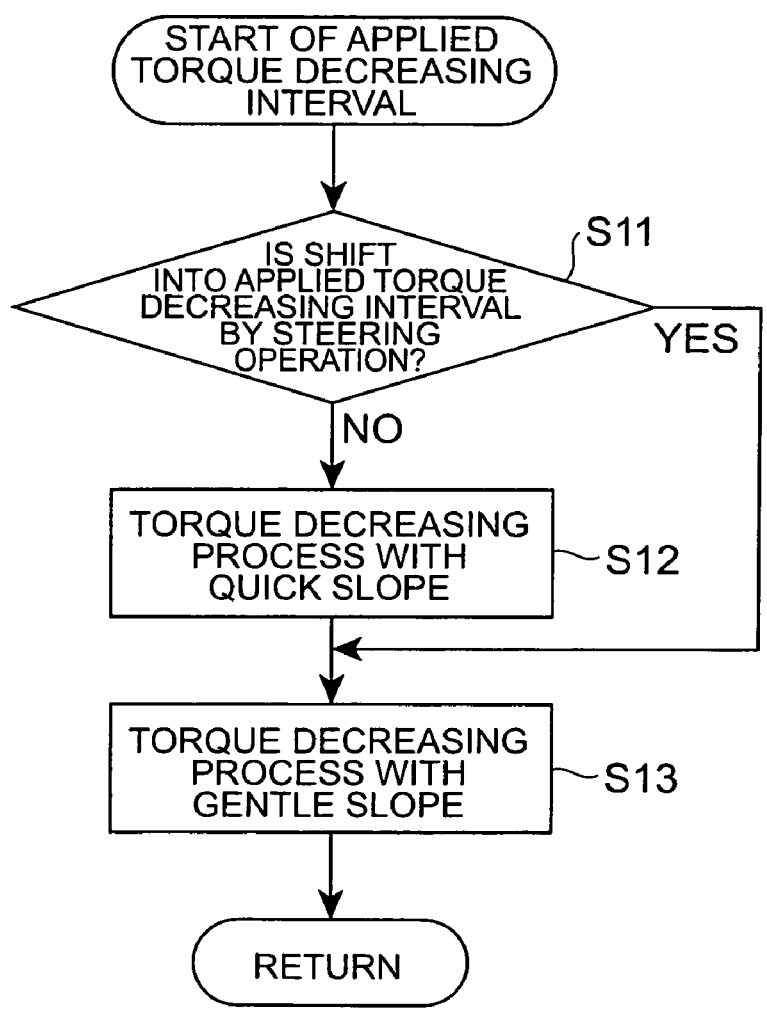
FIG. 11 is a flowchart showing a procedure after a start of a process in an applied torque decrease interval.

A procedure after a start of the applied torque decrease process will be described below. FIG. 11 is a flowchart showing the procedure after the start of the applied torque decrease interval process.

After a start of the applied torque decrease interval process, it is determined as to a shift into the applied torque decrease interval process that the shift into the applied torque decrease interval process was made by a steering operation (S11). When the result is that the shift was made into the applied torque decrease interval by any end condition other than the steering operation, a torque decrease process with a steep slope is carried out (S12).

Figure 12:
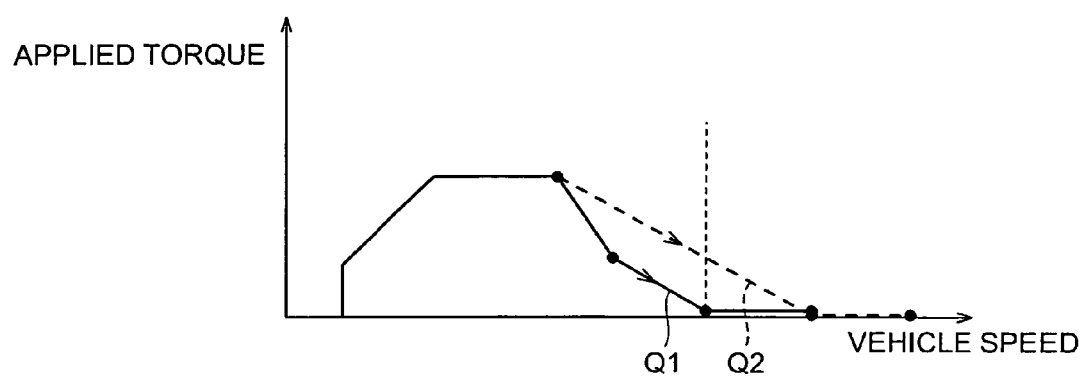
FIG. 12 is a graph showing a temporal change of applied torque in the process shown in FIG. 11.

In this case, as indicated by a solid line Q1 in FIG. 12, the applied torque decrease process with a steep slope is first carried out in an applied torque decrease interval (Close interval). In the applied torque decrease process with the steep slope, the range of the friction amount of the steering system is set as a quick decrease range, and the applied torque is quickly decreased in this quick decrease range. By quickly decreasing the applied torque in this manner, it is feasible to reduce the applied torque to 0 in an early stage, without causing driver's uncomfortableness.

After completion of the quick decrease process of the applied torque in the quick decrease range, a torque decrease process with a gentle slope is then carried out (S13). In the applied torque decrease process with the gentle slope, the applied torque is decreased at a change rate not to cause driver's uncomfortableness even during the decrease of the applied torque.

On the other hand, when it is determined at step S11 that the shift was made into the applied torque decrease interval process by the steering operation, there is no friction amount of the steering system by virtue of the steering operation. In this case, as indicated by a dashed line Q2 in FIG. 12, the applied torque is decreased at the gentle slope from the maximum applied torque (S13), without setting the quick decrease range. In this way, the process in the applied torque decrease interval is completed.

Figure 13:
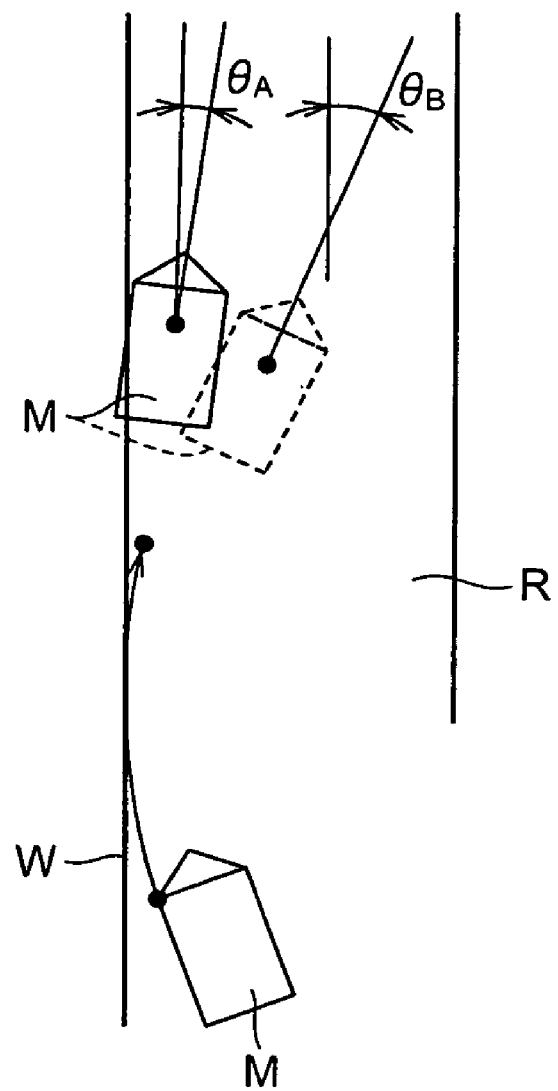
FIG. 13 is an illustration for explaining travel paths of a vehicle with and without setting of a quick decrease range of applied torque in the applied torque decrease interval.

When the quick decrease range is set in the applied torque decrease interval process as described above, the applied torque decrease process can be performed within a short time, with little driver's uncomfortableness in the vehicle behavior and steering. When the quick decrease range is set, the angle between the direction of the host vehicle after completion of the control and a boundary-line W on the road R becomes a vehicle deflection angle θA, for example, as indicated by a solid line in FIG. 13. In contrast to it, if the quick decrease range is not set, the angle between the direction of the host vehicle after completion of the control and the boundary-line W on the road R becomes a vehicle deflection angle θB, for example, as indicated by a dashed line in FIG. 13. The vehicle deflection angle θA with setting of the quick decrease range is smaller than the vehicle deflection angle θB without setting of the quick decrease range. Therefore, where the quick decrease range is set, the vehicle deflection angle after completion of the control becomes smaller, so that the vehicle can return to the lane at the angle closer to the direction along the lane.

Based on the above concepts, the time-varying wave pattern of the applied torque shown in FIG. 5, which is the deviation alleviation control target torque at step S5 in the flowchart shown in FIG. 3, is set as described below.

The time-varying wave pattern of applied torque is composed of four intervals of the Start interval, the Keep interval, the Close interval, and the Freeze interval. First, the time-varying wave pattern in the Keep interval is determined based on the maximum applied torque determined at step S3. In the Keep interval, the applied torque of the maximum applied torque is kept applied. The continuation time of the Keep interval is determined by calculating a time from a lane deviation state to a return, based on the vehicle speed, the vehicle width, the offset amount of the host vehicle, and so on. However, where the application end condition is one except for the return from the lane deviation state, a shift is made into the Close interval at a point of time when the application return condition is met.

After the setting of the Keep interval, the initial value of the applied torque in the Start interval is set. The initial value of the applied torque is set as follows: the torque quantity X shown in FIG. 10, which is the steering system friction amount determined based on the friction property of the steering mechanism, is set as the initial value of applied torque as it is. When the steering system friction amount is set as the initial value of applied torque, the vehicle behavior for deviation prevention appears in an early stage, whereby the driver can feel the applied torque.

Since the continuation period of the Start interval is determined to be a fixed time, e.g., 0.4 sec, the rate of increasing applied torque in the Start interval is then determined based on the initial value of applied torque and the maximum applied torque. The applied torque is increased at this rate. Since the continuation period of the Start interval is set at the fixed time, a sufficient deviation margin time can be secured even in the high vehicle speed range.

Subsequently, the time-varying wave pattern in the Close interval is determined. In the Close interval, the time-varying wave pattern is determined according to the flowchart shown in FIG. 12. When the shift into the Close interval is made by a condition except for the steering operation, the quick decrease range is set, and the time-varying wave pattern to quickly decrease the applied torque is set during the period of decrease of the applied torque equivalent to the steering system friction amount. After the decrease of the applied torque equivalent to the steering system friction amount, the wave pattern is determined so as to decrease the applied torque at the rate not to cause driver's uncomfortableness even with the decrease of the applied torque. In this manner, the application of the applied torque can be terminated in an early stage, without causing driver's uncomfortableness.

On the other hand, where the shift into the Close interval is made by the steering operation, the quick decrease range is not set and the time-varying wave pattern is set to decrease the applied torque at the rate not to cause driver's uncomfortableness even with the decrease of the applied torque, though not shown in FIG. 5. This makes it feasible to prevent the driver from feeling uncomfortable, even with decrease of the applied torque.

What is claimed is:

1. A driving operation support system for, when lane deviation estimating means estimates that a moving vehicle will deviate from a lane, applying a warning torque to the vehicle to prevent a deviation from the lane.
    wherein a pattern of application of the warning torque to the vehicle is determined according to a vehicle speed, and the warning torque is increased with increase in the vehicle speed when estimating that the vehicle will deviate from the lane,
    when applying a maximum warning torque, the warning torque increases to its maximum at a specified rate, and
    the rate of increasing the warning torque is so set that a time necessary to reach the maximum warning torque is kept constant.

2. A driving operation support system for, when lane deviation estimating means estimates that a moving vehicle will deviate from a lane, applying a warning torque to the vehicle to prevent a deviation from the lane.
    wherein a pattern of application of the warning torque to the vehicle is determined according to a vehicle speed, and the warning torque is increased with increase in the vehicle speed when estimating that the vehicle will deviate from the lane,
    in an operation of decreasing the warning torque that was increased after increasing the warning torque, the warning torque is decreased at an absolute rate different from an absolute rate during the increase of the warning torque, and
    in an operation of increasing the warning torque to a maximum, a rate of the increasing the warning torque in a predetermined first increase period from a start of the increase is set larger than a rate of increasing the warning torque in a second increase period subsequent to the first increase period.

3. A driving operation support method for, when estimating that a moving vehicle will deviate from a lane, applying a warning torque to the vehicle to prevent a deviation from the lane, wherein a pattern of application of the warning torque to the vehicle is determined according to a vehicle speed, and the warning torque is increased with increase in the vehicle speed when estimating that the vehicle will deviate from the lane, when applying a maximum waning torque, the warning torque increases to its maximum at a specified rate, and the rate of increasing the warning torque is so set that a time necessary to reach the maximum warning torque is kept constant.

4. A driving operation support method for, when estimating that a moving vehicle will deviate from a lane, applying a warning torque to the vehicle to prevent a lane deviation, wherein in an operation of increasing the warning torque to a maximum, a rate of increasing the warning torque in a predetermined first increase period from a start of the increase is set larger than a rate of increasing the warning torque in a second increase period subsequent to the first increase period, and in an operation of decreasing the warning torque from the maximum, a rate of decreasing the warning torque in a predetermined first decrease period from a start of the decrease is set larger than a rate of decreasing the warning torque in a second decrease period subsequent to the first decrease period.

5. The driving operation support method according to claim 4, wherein an absolute rate of increasing the warning torque in the first increase period is smaller than an absolute rate of decreasing the warning torque in the first decrease period.

6. The driving operation support method according to claim 4, wherein a process of preventing the lane deviation by an application of the warning torque is set to be terminated by a steering operation, and wherein when the process is terminated by the steering operation, the warning torque is decreased at the rate of decreasing the warning torque in the second decrease period from the start of the decrease.

7. A driving operation support method for, when estimating that a moving vehicle will deviate from a lane, applying a warning torque to the vehicle to prevent a deviation from the lane, wherein a pattern of application of the warning torque to the vehicle is determined according to a vehicle speed, and the warning torque is increased with increase in the vehicle speed when estimating that the vehicle will deviate from the lane, in an operation of decreasing the warning torque that was increased after increasing the warning torque, the warning torque is decreased at an absolute rate different from an absolute rate during the increase of the warning torque, and in an operation of increasing the warning torque to a maximum, a rate of increasing the warning torque in a predetermined first increase period from a start of the increase is set larger than a rate of increasing the warning torque in a second increase period subsequent to the first increase period.

* * * * *